US012600851B2

(12) United States Patent
Wittenberg et al.

(10) Patent No.: US 12,600,851 B2
(45) Date of Patent: Apr. 14, 2026

(54) THERMOPLASTIC COMPOUNDS CONTAINING RECYCLING MATERIAL WITH SUPERIOR QUALITY

(71) Applicant: INEOS STYROLUTION GROUP GMBH, Frankfurt am Main (DE)

(72) Inventors: Nils Wittenberg, Hofheim am Taunus (DE); Norbert Niessner, Friedelsheim (DE); Michiel Verswyvel, Mechelen (BE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 914 days.

(21) Appl. No.: 17/781,603

(22) PCT Filed: Dec. 2, 2020

(86) PCT No.: PCT/EP2020/084280
§ 371 (c)(1),
(2) Date: Jun. 1, 2022

(87) PCT Pub. No.: WO2021/110751
PCT Pub. Date: Jun. 10, 2021

(65) Prior Publication Data
US 2023/0002608 A1 Jan. 5, 2023

(30) Foreign Application Priority Data

Dec. 4, 2019 (EP) ..................................... 19213403

(51) Int. Cl.
| | |
|---|---|
| *C08L 55/02* | (2006.01) |
| *C08L 25/12* | (2006.01) |
| *C08L 51/04* | (2006.01) |
| *C08L 53/02* | (2006.01) |

(52) U.S. Cl.
CPC .............. *C08L 55/02* (2013.01); *C08L 25/12* (2013.01); *C08L 51/04* (2013.01); *C08L 53/02* (2013.01); *C08L 2203/30* (2013.01); *C08L 2205/025* (2013.01); *C08L 2205/035* (2013.01); *C08L 2207/20* (2013.01)

(58) Field of Classification Search
CPC .......... C08L 2205/035; C08L 2207/20; C08L 51/04; C08L 55/02; C08L 53/02
See application file for complete search history.

(56) References Cited

U.S. PATENT DOCUMENTS

| | | | |
|---|---|---|---|
| 4,224,419 A | 9/1980 | Swoboda et al. | |
| 5,399,433 A | 3/1995 | Kobler | |
| 5,653,867 A | 8/1997 | Jody et al. | |
| 6,007,005 A * | 12/1999 | Gonzales | B29B 17/02 |
| | | | 241/20 |
| 6,031,053 A | 2/2000 | Knoll et al. | |
| 6,197,889 B1 | 3/2001 | Knoll et al. | |
| 6,238,579 B1 | 5/2001 | Paxton et al. | |
| 6,335,376 B1 | 1/2002 | Allen, III et al. | |
| 2003/0181583 A1 | 9/2003 | Duijzings et al. | |
| 2012/0061287 A1 | 3/2012 | Knoll et al. | |
| 2016/0297957 A1 | 10/2016 | Boeckmann et al. | |

FOREIGN PATENT DOCUMENTS

| | | | |
|---|---|---|---|
| CN | 104231535 A † | 12/2014 | |
| CN | 105255096 A † | 1/2016 | |
| CN | 107501850 A | 12/2017 | |
| CN | 108559214 A | 9/2018 | |
| DE | 2826925 A1 | 1/1980 | |
| EP | 0022200 A1 | 1/1981 | |
| EP | 0111260 A1 | 6/1984 | |
| EP | 1494843 B1 | 2/2010 | |
| WO | 9535335 A1 | 12/1995 | |
| WO | 9740079 A1 | 10/1997 | |
| WO | 200210222 A1 | 2/2002 | |
| WO | 2003086733 A1 | 10/2003 | |

(Continued)

OTHER PUBLICATIONS

Rudolf Pfaendner Restabilization—30 years of research for quality improvement of recycled plastics review, Polymer Degradation and Stability, vol. 203, 2022 (Year: 2022).*
Scholtan et al., "Bestimmung der Teilchengrossenverteilung von Latices mit der Ultrazentrifuge," Kolloid-Z. u. Z. Polymere 250:782-796 (1972) (the relevance of which is discussed on p. 9, lines 36-40 of the application).
Schuch et al., "PSD from hydrodynamic chromatography and comparison with other analytical techniques," in "Measurement of Particle Size Distribution of Polymer Latexes," Editors: Gugliotta and Vega, 129-153 (2010).

(Continued)

*Primary Examiner* — Mark S Kaucher
(74) *Attorney, Agent, or Firm* — RAPHAEL BELLUM PLLC

(57) ABSTRACT

The invention relates to thermoplastic molding compositions (T) comprising 10 to 99% by weight, based on the total weight of the molding composition (T), of at least one type of recycled polymer material (A), containing 20 to 100% by weight, based on recycled material (A), of recycled acrylonitrile-butadiene-styrene copolymer (A1); up to 80% by weight of at least one recycled styrene-acrylonitrile copolymer (A2); up to 10% by weight of recycled polymeric impurities (A3), different from (A1) and (A2); 0.1 to 30% by weight, based on the total weight of the molding composition (T), of at least one graft copolymer (B), different from (A); 0.1 to 18% by weight, based on the molding composition (T), of block copolymer (C); and optionally up to 89.8% by weight of further polymer component (D), different from (A), (B) and (C); optionally up to 30% by weight of filler and/or reinforcing agent (E); and optionally up to 30% by weight of further additive (F).

20 Claims, No Drawings

(56)　　　　　　References Cited

FOREIGN PATENT DOCUMENTS

| WO | 2010072596 | A1 | 7/2010 |
| WO | 2015078751 | A1 | 6/2015 |
| WO | 2017182435 | A1 | 10/2017 |
| WO | 2019201784 | A1 | 10/2019 |

OTHER PUBLICATIONS

Lange, "Bestimmung von Teilchengrossen aus Trubung und Brechungsinkrement," Kolloid-Zeitschrift und Zeitschrift fuer Polymere, Band 223, Heft 1: 24-30 (the relevance of which is discussed on p. 10, lines 31-9 of the application).
Biswal et al., "Effect of reactive compatibilizers and impact modifier on the performance characteristics of polycarbonate/poly(acrylonitrile-butadiene-styrene) blends obtained from E-waste," International Journal of Plastics Technology 17(2):209-225 (2014).
Vazquez et al., "Compatibilization Strategies for Recycling Applications of High Impact Polystyrene/Acrylonitrile Butadiene Blends," J. Polym. Environ. 25:903-912 (2017).

* cited by examiner
† cited by third party

THERMOPLASTIC COMPOUNDS CONTAINING RECYCLING MATERIAL WITH SUPERIOR QUALITY

The present invention is directed to a thermoplastic compound or molding composition (T) comprising at least one type of recycled polymer material (A) containing recycled acrylonitrile-butadiene-styrene copolymer (r-ABS) as component (A1), at least one graft copolymer (B) different from (A) and at least one block copolymer (C). Further, the invention relates to a process for the preparation of the thermoplastic molding composition (T), the use of the thermoplastic molding composition (T) for preparing a shaped article and a shaped article prepared from the thermoplastic molding composition (T).

Products made from, or incorporating plastic components are part of almost any work place or home environment. Most of these plastics are virgin plastics that are produced from petroleum. In the recent years, there has been a strong movement to recycle and reuse petrochemical products, such as plastics, in addition to metallic material. Recycling plastic (recycling material) from waste plastic materials has a variety of benefits compared to producing virgin plastic from petroleum, e.g. less energy is required, the need for disposing waste material is reduced, and the use of limited geological resources, such as petroleum, is reduced. Typically, waste plastic materials include post-consumer and post-industrial waste materials and plastic scrap. Some of the most common polymer types in waste plastic materials from durable goods are acrylonitrile-butadiene-styrene copolymers (ABS), high impact polystyrene (HIPS), polypropylene (PP) and polycarbonate (PC).

Durable goods, such as automobile equipment, appliance and electronic equipment, represents a significant portion of municipal waste and are increasingly being collected at the end of their lives and partly recycled in order to avoid disposal cost and to recover metals and other marketable raw materials. Generally, the metal content in automobiles, appliances and electronics is higher than the plastics content (typically plastics content is less than 30%). Thus, the metal recovery operation often precedes plastic recovery. Most metal recovery operations shred equipment, in order to cost-effectively liberate metals from the durable goods.

The recovery of plastics from durable goods often requires a plastic-rich raw material. Typically, such plastic rich raw materials obtained from metal recyclers or automotive shredder residues are highly variable mixtures obtained from different types of durable goods, and as a consequence they are highly variable mixtures of different types and grades of polymers.

Often, highly contaminated scrap is hand-separated at significant local environmental cost. The challenges in recycling plastics from durable goods include multiple plastic types, multiple resin grades of the same plastic types, large amounts of contaminants, such as fillers, reinforcing agents, and pigments, metal, paint and metallic coatings, as well as highly variable part sizes and shapes.

Different grades of certain plastics have particular sets of targeted physical characteristics or properties. The particular physical characteristics or properties of a grade are controlled by the chemical composition of the polymers in the grade, the average molecular weights and molecular weight distributions of polymers in the grade, the rubber morphology for impact modified grades, and the types of additives in the grade.

Different grades of a given plastic type are generally compatible. Grades can generally be melt-mixed to create a new material with a different property profile. Different plastic types, on the other hand, cannot generally be melt-combined as easily unless the types happen to be compatible. Blends of different polymers, which are not compatible, lead to decreased mechanical performance. The adhesion between phases of non-compatible polymers is low. Contamination at lower levels, which does not affect the mechanical properties, can still lead to surface defects such as stripes.

In order to create high value products, the plastic recycling process often must be able to separate highly mixed streams of a plastic type on a flake-by-flake basis to achieve products with acceptable purity. Methods, such as separation by density, density differential alteration (DDA), froth flotation, color sorting and tribo-electrostatic separation (TES), have been used to achieve some purification of the plastics derived from durable goods, as described, for example, in Paul Allen, Development of Hydrocyclones for Use in Plastics Recycling (American Plastics Council, 1999), U.S. Pat. Nos. 6,238,579, 6,335,376, 5,653,867 and 5,399,433.

The document WO 2003/086733 describes a process for preparing recycled plastics wherein a plastic rich mixture is separated in multiple steps selected from preprocessing operations, size reduction operations, gravity concentration operations, color sorting, sorting by thickness, friction, or differential terminal velocity or drag in air, surface to mass control operations, separating processes enhanced by narrow surface to mass distribution, blending operations, and extrusion and compounding operations. For example the process described in WO 03/086733 may provide a recycled ABS plastic stream, wherein the plastic source may be refrigerators or automation equipment.

Often, the materials obtained from the above-mentioned methods do not meet today's requirements of highly pure and defined post-consumer recycling plastic.

EP-A 1494843 (MBA) claims a multistep recycling method for producing recycled plastic materials, that are characterized by a sequence of operations selected from the group consisting of preprocessing operations, size reduction operations, gravity concentration operations, color sorting, sorting by thickness, friction, or differential terminal velocity or drag in air, control operations based on the ratio of surface area to mass, separation processes enhanced by narrow surface to mass distributions, blending operations and extrusion and compounding operations. Plastic-rich mixtures are subjected to the process, and one or more recycled plastic materials are collected as outputs of the sequence of processes.

Still, this improvement typically does not provide recycled plastic materials with properties that are required for certain high quality applications, e.g. for use in electronic and automobile equipment. It is therefore necessary to provide recycling products that can be used for such purposes as an alternative to the corresponding virgin polymer products. There is a high demand for thermoplastic molding compositions containing recycled acrylonitrile-butadiene-styrene copolymers, having constantly good properties such as impact strength and flowability (melt flow rate/melt viscosity rate; MVR).

Surprisingly, it was found that combinations of a recycled material comprising recycled acrylonitrile-butadiene-styrene-copolymer (ABS) with a block copolymer and a graft copolymer as additives have a favorable property profile. There is a synergistic effect of the graft copolymer and the block copolymer on the impact strength of the recycled material whereas the negative effects of these copolymers on other properties of the recycled polymer material, which are usually observed if either the graft-copolymer or the block-copolymer is added alone, are surprisingly mitigated.

The present invention proposes to a thermoplastic molding composition (T) comprising (or consisting of):

A 10 to 99% by weight, based on the total weight of the thermoplastic molding composition (T), of at least one type of recycled polymer material (A), containing A1 20 to 100% by weight, based on the total weight of the recycled material (A), of at least one recycled acrylonitrile-butadiene-styrene copolymer (A1);

A2 optionally up to 80% by weight, based on the total weight of the recycled material (A), of at least one recycled styrene-acrylonitrile copolymer (A2);

A3 optionally up to 10% by weight, based on the total weight of the recycled material (A), of recycled polymeric impurities (A3), different from (A1) and (A2);

B 0.1 to 30% by weight, based on the total weight of the thermoplastic molding composition (T), of at least one graft copolymer (B), different from (A);

C 0.1 to 18% by weight, based on the total weight of the thermoplastic molding composition (T), of at least one block copolymer (C);

D optionally up to 89.8% by weight, based on the total weight of the thermoplastic molding composition (T), of at least one further polymer component (D), different from (A), (B) and (C);

E optionally up to 30% by weight, based on the total weight of the thermoplastic molding composition (T), of at least one filler and/or reinforcing agent (E) and F optionally up to 30% by weight, based on the total weight of the thermoplastic molding composition (T), of at least one further additive (F).

Preferably, the thermoplastic molding composition (T) comprises 20 to 99% by weight, more preferably 50 to 98% by weight, even more preferably 70 to 96% by weight, particularly preferably 80 to 90% by weight, based on the total weight of the thermoplastic molding composition (T), of the at least one type of recycled polymer material (A).

Furthermore, the thermoplastic molding composition (T) preferably comprises 0.5 to 25% by weight, more preferably 1 to 20% by weight, even more preferably 2 to 15% by weight, particularly preferably 5 to 10% by weight, based on the total weight of the thermoplastic molding composition (T), of the at least one graft copolymer (B).

Moreover, the thermoplastic molding composition (T) preferably comprises 0.5 to 16% by weight, more preferably 1 to 15% by weight, even more preferably 2 to 12% by weight, particularly preferably 5 to 10% by weight, based on the total weight of the thermoplastic molding composition (T), of the at least one block copolymer (C).

Optionally, the thermoplastic molding composition (T) preferably comprises up to 79% by weight, more preferably up to 48% by weight, even more preferably up to 26% by weight, particularly preferably up to 10% by weight, based on the total weight of the thermoplastic molding composition (T), of the at least one further polymer component (D).

Furthermore, the thermoplastic molding composition (T) optionally comprises preferably up to 25% by weight, more preferably up to 20% by weight, even more preferably up to 10% by weight, particularly preferably up to 5% by weight, based on the total weight of the thermoplastic molding composition (T), of at least one filler and/or reinforcing agent (E).

Moreover, the thermoplastic molding composition (T) optionally comprises preferably up to 20% by weight, more preferably up to 10% by weight, even more preferably up to 8% by weight, particularly preferably up to 5% by weight, based on the total weight of the thermoplastic molding composition (T), of the at least one further additive (F).

In a preferred embodiment of the invention, the thermoplastic molding composition (T) comprises, preferably consists of, the components (A), (B), (C), optionally (D), optionally (E) and optionally (F) in the preferable amounts defined above.

In a preferred embodiment of the invention, the thermoplastic molding composition (T) comprises, preferably consists of, the components (A), (B), (C), optionally (D), optionally (E) and optionally (F) in the more preferable amounts defined above.

In a preferred embodiment of the invention, the thermoplastic molding composition (T) comprises, preferably consists of, component (A), which contains at least one ABS and one SAN-copolymer; component (B), which contains at least one ABS copolymer, and component (C), which contains at least one SBC-block copolymer, and at least one further additive (F).

In one embodiment of the invention, the thermoplastic molding composition (T) does not contain the optional components (D) and (E).

In another embodiment of the invention, the thermoplastic molding composition (T) contains the component(s) (D), (E) and/or (F).

The components (A), (B), (C), (D), (E) and (F) are defined below in more detail.

In a preferred embodiment of the invention, the weight ratio of the at least one graft copolymer (B) to the at least one block copolymer (C) in the thermoplastic molding composition (T) is from 1:3 to 3:1, preferably from 1:2 to 2:1, more preferably from 1:1.2 to 1.2:1.

Recycled Polymer Material (A)

In terms of the present invention, the recycled polymer material (A) is prepared from waste polymer material that preferably is rich in acrylonitrile-butadiene-styrene-copolymer(s), typically in a recycling and separation process. Preferably, the recycled polymer material (A) is a recycled material obtained from the recycling of post-consumer and/or post-industrial goods, more preferably post-consumer durable goods, even more preferably post-consumer automobile equipment, household appliance and electrical equipment.

Typically, durable goods are being understood as goods, such as household appliance, machinery, sport equipment, consumer electronics, and automobiles, that are not consumed or destroyed quickly in use, but are expected to last and yield utility a long time, in particular three or more years.

A suitable recycled polymer material (A) in terms of the present invention contains:

A1 20 to 100% by weight, preferably 20 to 80% by weight, more preferably 21 to 60% by weight, even more preferably 22 to 50% by weight, particularly preferably 23 to 40% by weight based on the total weight of the recycled material (A), of at least one recycled acrylonitrile-butadiene-styrene copolymer (A1);

A2 optionally up to 80% by weight, preferably 20 to 80% by weight, more preferably 40 to 79% by weight, even more preferably 50 to 78% by weight, particularly preferably 60 to 77% by weight, based on the total weight of the recycled material (A), of at least one recycled styrene-acrylonitrile copolymer (A2); and A3 optionally up to 10% by weight, preferably up to 5% by weight, more preferably up to 3% by weight, even more preferably up to 2.5% by weight, particularly preferably less than 1% by weight, based on the total weight of the recycled material (A), of recycled polymeric impurities (A3), different from (A1) and (A2).

In a preferred embodiment of the invention, the recycled polymer material (A) contains, the components (A1), optionally (A2) and optionally (A3) in the preferable amounts defined above.

In a preferred embodiment of the invention, the recycled polymer material (A) contains, the components (A1), optionally (A2) and optionally (A3) in the more preferable amounts defined above.

In a preferred embodiment of the invention, the recycled polymer material (A) contains, the components (A1), optionally (A2) and optionally (A3) in the even more preferable amounts defined above.

In a preferred embodiment of the invention, the recycled polymer material (A) contains 23 to 40% by weight, based on the total weight of the recycled material (A), component (A1) which is an ABS, and contains 60 to 77% by weight, based on the total weight of the recycled material (A), component (A2) which is a SAN-copolymer, and contains 1 to 2.5% by weight, based on the total weight of the recycled material (A), component (A3) which is a HIPS-component.

Furthermore, the recycled polymer material (A) may contain recycled, non-polymeric and/or inorganic impurities, such as recycled additives. Often the recycled polymer materials (A) contain pigments, particulate fillers and/or reinforcing agents that were not removed during the recycling process.

Preferably the recycled polymer material (A) contains less than 5% by weight, more preferably less than 2% by weight, even more preferably less than 1% by weight, based on the total weight of the recycled material (A), of non-polymeric and/or inorganic impurities.

The recycled polymer material (A) can for example comprise a mixture of different grades of recycled acrylonitrile-butadiene-styrene (ABS) copolymers (A1) and optionally of recycled styrene-acrylonitrile (SAN) copolymers (A2), or can contain a single grade of recycled ABS copolymers (A1) and optionally of recycled SAN copolymers (A2). For example the recycled polymer material (A) can be obtained from scrap and rejected parts from a manufacturing process of ABS-moldings and or ABS/SAN-moldings.

As recycled polymeric impurities (A3), the recycled polymer material (A) may typically contain those polymeric impurities that are usually compounded with ABS and optionally during the manufacture of consumer goods or industrial goods, and which are inevitably recycled together with the polymer material from these goods. Such polymeric impurities include, but are not limited to SMMA (styrene-methyl methacrylate copolymer) PMMA (polymethyl methacrylate), styrene-acrylonitrile-methyl methacrylate copolymers, polycarbonates (PC) (including aromatic polycarbonates and aromatic polyester carbonates), polyamides (PA), polyesters, polyoxyalkylene, polyarylene sulfides, polyether ketones, and polyvinyl chlorides. Preferably, if recycled polymeric impurities (A3) are present in the recycled polymer material (A), they are selected from recycled polycarbonates (PC) (including aromatic polycarbonates and aromatic polyester carbonates), recycled polyamides (PA), and recycled polyesters, more preferably from recycled polycarbonates and recycled polyamides, even more preferably from recycled aromatic polycarbonates and recycled semicrystalline polyamides.

In one embodiment, the recycled polymer material (A) does not contain any recycled polymeric impurities (A3).

Preferably, the polymer material (A) is obtained from polymer flakes from waste polymer stream, which are mixed and optionally compounded in order to level properties. Furthermore, preferably the content of non-polymeric components is low, especially the content of solid "hard spots" is low. In a particularly preferred embodiment, prior to the above mentioned compounding for levelling the properties, hard non-melted impurities are removed from the polymer material (A) e.g. by one or more sieves.

In a preferred embodiment, the recycled polymer material (A) exhibits one or more of the following physical properties:

Melt volume flow rate (MVR) (measured on a polymer melt at 220° C. and 10 kg load according to ISO 1133-1:2011) in the range of 10 to 35 $cm^3$/10 min;

Vicat temperature (Vicat B/50 measured according to ISO 306:2004) of more than 80° C., preferably in the range of 80 to 100° C.;

Stress at yield (measured in accordance with ISO 527) in the range of 30 to 50 MPa;

Strain at yield (measured in accordance with ISO 527, 2012) in the range of 2 to 3%;

Charpy Notched Impact Strength at 23° C. (measured in accordance with EN-ISO 179-1, (e.g. 2010) notch type A) in the range of 2 to 20 $kJ/m^2$;

Charpy Notched Impact Strength at −30° C. (measured in accordance with EN-ISO 179-1, notch type A) in the range of 2 to 15 $kJ/m^2$.

Graft Copolymer (B)

The graft copolymer (B) in the thermoplastic molding composition (T) of the invention may in general be any graft copolymer that can be used as an additive in thermoplastic molding compositions in order to improve impact resistance. Preferably, the graft copolymer (B) of the invention is one that is obtained by emulsion polymerization. In terms of the present invention, the term emulsion polymerization includes commonly known polymerization methods, where the polymer is produced in droplets surrounded by water, such as for example emulsion polymerization, micro-suspension polymerization, and suspension polymerization. Preferably, the term emulsion polymerization is directed to polymerization methods, wherein the polymer is produced in the monomer droplets of an aqueous emulsion of monomer droplets, wherein at least one surfactant is present in an amount above the critical micelle concentration and the polymerization is initiated by at least one aqueous soluble initiator.

Often the graft copolymer (B) has a complex structure and is in essence composed of one or more graft base(s) ('core') (B1) and one or more graft shell(s) (B2). Typically, the graft copolymer (B) is produced in form of a latex (rubber) by emulsion polymerization, wherein firstly one or more graft base(s) (B1) are obtained by emulsion polymerization of monomers (B11) and optionally (B12), as described hereinafter, and afterwards one or more graft shell(s) (B2) are obtained by graft emulsion polymerization of further monomers (B21) and/or (B22), as described hereinafter, in the presence of one or more of the graft base (B1). Furthermore, mixtures of two or more graft copolymers (B), which differ in their structure, can be used according to the invention.

The monomers (B11) are preferably selected from diene monomers, preferably from butadiene, isoprene and mixtures thereof, more preferably 1,3-butadiene.

The monomers (B12) are preferably selected from the group consisting of styrene, α-methyl styrene, acrylonitrile, methacrylonitrile, isoprene, chloroprene, (para, meta or ortho-) $C_1$-$C_4$ alkyl styrene, (meth)acrylic acid $C_1$-$C_8$-alkyl esters, alkylenglykol-di(meth)acrylate, divinylbenzene, and mixtures thereof, more preferably from the group consisting of styrene, acrylonitrile and mixtures thereof, even more preferably styrene.

The monomers (B21) are preferably selected from vinylaromatic monomers, more preferably selected from the group consisting of styrene, α-methyl styrene and mixtures of styrene with α-methyl styrene and/or para-methylstyrene, even more preferably from sryrene, α-methyl styrene and mixtures thereof, particularly preferably styrene.

The monomers (B22) are preferably selected from acrylonitrile, (meth)acrylic acid $C_1$-$C_8$-alkyl esters, mixtures of acrylonitrile with (meth)acrylic acid $C_1$-$C_8$-alkyl esters (e.g. methyl methacrylate or ethyl meth-acrylate), and mixtures of acrylonitrile and/or one or more (meth)acrylic acid $C_1$-$C_8$-alkyl esters with methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide). More preferably, the monomers (B22) are selected from acrylonitrile, (meth)acrylic acid $C_1$-$C_8$-alkyl esters and mixtures thereof, even more preferably from acrylonitrile and mixtures of methyl meth-acrylate with other (meth) acrylic acid $C_1$-$C_8$-alkyl esters, particularly preferably from acrylonitrile and methyl methacrylate.

Preferably, the graft copolymer (B) latex is polymerized by aqueous free-radical emulsion polymerization. The polymerization reaction is typically initiated via water-soluble or oil-soluble free-radical polymerization initiators, e.g. inorganic or organic peroxides or azides, such as peroxodisulfate or benzoyl peroxide, or with the aid of redox initiator systems. The documents WO 2002/10222, DE-A 28 26 925, and also EP-A 022 200 describe suitable polymerization processes.

Typically the graft copolymer B (obtained as latex) has an average particle diameter (weight median particle size $D_{50}$) of 50 to 1000 nm, preferred 90 to 700 nm. The particle size of latex particles can be governed during synthesis by suitable means known in the literature, e.g. DE-A 28 26 925.

Typically the particle diameter D50 can be measured by ultracentrifugation (e.g. described in W. Scholtan, H. Lange, Kolloid-Z. u. Z. Polymere 250, S. 782 bis 796, 1972) or using Hydrodynamic Chromatography HDC (e.g. W. Wohlleben, H. Schuch, "Measurement of Particle Size Distribution of Polymer Latexes", 2010, Editors: L. Gugliotta, J. Vega, p. 130-153).

The particle diameter D50 represents the value of the particle size distribution curve where 50 wt.-% of the particles (e.g. latex particles) have a diameter smaller than or equal to the D50 value and the other 50 wt.-% have a diameter larger than the D50 value. In similar way for example the D90 and D10 values give the particle diameters where 90 wt.-% or 10 wt.-%, respectively, of all particles have a diameter smaller than or equal to the respective value. The average particle size can be also determined by turbidity measurement as described in Lange, Kolloid-Zeitschrift and Zeitschrift fur Polymere, Band 223, Heft 1. Generally, the broadness U of particle size distribution is defined by: $U = (D90 - D10)/D50$.

In a preferred embodiment, the graft copolymer (B) comprises, preferably consists of B1 5 to 95% by weight, preferably 40 to 85% by weight, based on the total weight of graft copolymer (B), of at least one graft base (B1), which is obtained by emulsion polymerization of:

B11 50 to 100% by weight, preferably 60 to 100% by weight, more preferably 80 to 100% by weight, based on the total weight of graft base (B1), of butadiene and/or isoprene, preferably butadiene, as monomer (B11); and B12 0 to 50% by weight, preferably 0 to 40% by weight, more preferably 0 to 20% by weight, based on the total weight of graft base (B1), of at least one further monomer (B12) selected from styrene, α-methylstyrene, acrylonitrile; methacrylonitrile, isoprene, chloroprene, (para, meta or ortho-)$C_1$-$C_4$ alkyl styrene, (meth)acrylic acid $C_1$-$C_8$-alkyl esters, alkylenglykol-di(meth)acrylate and divinylbenzene, preferably styrene, for example 0.1 to 20% by weight, based on the total weight of graft base (B1), of styrene;

wherein the total weight of (B11) and (B12) is 100% by weight based on the total weight of graft base (B1); and B2 95 to 5% by weight, preferably 15 to 60% by weight, based on the total weight of graft copolymer (B), of at least one graft shell (B2), which is obtained by emulsion polymerization of, in the presence of the at least one graft base (B1):

B21 50 to 95% by weight, preferably 65 to 80% by weight, more preferably 75 to 80% by weight, based on the total weight of graft shell (B2), of at least one vinylaromatic monomer (B21), selected from styrene, α(alpha)-methylstyrene or mixtures of styrene with at least one further monomer selected from α(alpha)-methylstyrene, p(para)-methylstyrene and $C_1$-$C_8$ alkyl(meth)acrylate, preferably $C_1$-$C_4$ alkyl (meth)acrylate (e.g. methyl methacrylate or ethyl meth-acrylate); and B22 5 to 50% by weight, preferably 20 to 35% by weight, more preferably 20 to 25% by weight, based on the total weight of graft shell (B2), of at least one ethylenically unsaturated monomer (B22), selected from acrylonitrile or mixtures of acrylonitrile and at least one further monomer selected from methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, such as N-cyclohexylmaleimide or N-phenylmaleimide);

wherein the total weight of (B21) and (B22) is 100% by weight, based on the total weight of graft shell (B2).

In a particularly preferred variant of this preferred embodiment, monomer (B21) is styrene and/or α(alpha)-methylstyrene and the monomer (B22) is acrylonitrile.

In another preferred embodiment, the graft copolymer (B) comprises, preferably consists of B1 5 to 95% by weight, preferably 40 to 85% by weight, based on the total weight of graft copolymer (B), of at least one graft base (B1), which is obtained by emulsion polymerization of:

B11 50 to 100% by weight, preferably 60 to 100% by weight, more preferably 80 to 100% by weight, based on the total weight of graft base (B1), of butadiene and/or isoprene, preferably butadiene, as monomer (B11); and B12 0 to 50% by weight, preferably 0 to 40% by weight, more preferably 0 to 20% by weight, based on the total weight of graft base (B1), of at least one further monomer (B12) selected from styrene, α-methylstyrene, acrylonitrile; methacrylonitrile, isoprene, chloroprene, (para, meta or ortho-)$C_1$-$C_4$ alkyl styrene, (meth)acrylic acid $C_1$-$C_8$-alkyl esters, alkylenglykol-di(meth)acrylate and divinylbenzene, preferably styrene, for example 0.1 to 20% by weight, based on the total weight of graft base (B1), of styrene;

wherein the total weight of (B11) and (B12) is 100% by weight based on the total weight of graft base (B1); and B2 95 to 5% by weight, preferably 15 to 60% by weight, based on the total weight of graft copolymer (B), of at least one graft shell (B2), which is obtained by emulsion polymerization of, in the presence of the at least one graft base (B1):

B21 0 to 80% by weight, preferably 40 to 80% by weight or alternatively 0 to 5% by weight, based on the total weight of graft shell (B2), of at least one vinylaromatic monomer (B21), selected from styrene, $\alpha$(alpha)-methylstyrene or mixtures of styrene and at least one further monomer selected from $\alpha$(alpha)-methylstyrene and p(para)methylstyrene; and B22 20 to 100% by weight, preferably 20 to 60% by weight or alternatively 95 to 100% by weight, based on the total weight of graft shell (B2), at least one acrylic monomer (B22), selected from $C_1$-$C_8$ alkyl (meth)acrylate, preferably $C_1$-$C_4$ alkyl(meth)acrylate (e.g. methyl methacrylate or ethyl meth-acrylate) or mixtures thereof with one further monomer selected from acrylonitrile, methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide);

wherein the total weight of (B21) and (B22) is 100% by weight, based on the total weight of graft shell (B2).

In a particularly preferred variant of this preferred embodiment, monomer (B21) is styrene and monomer (B22) is methyl methacrylate.

In a further particularly preferred variant of this preferred embodiment, monomer (B21) is not present and monomer (B22) is a mixture of methyl methacrylate and 0.01 to 2% by weight, based on the total weight of graft shell (B2), of at least one $C_1$-$C_8$ alkyl acrylate.

In a particularly preferred embodiment, the graft copolymer (B) is an ABS graft copolymer composed of a graft base (B1), obtained by emulsion polymerization of butadiene as monomer (B11), and styrene as monomer (B12), and a graft shell (B2), which is obtained by emulsion polymerization of monomer (B21) selected from styrene, $\alpha$-methylstyrene and mixtures thereof, and acrylonitrile as monomer (B22) in the presence of the graft base (B1).

Furthermore graft copolymers (B), having two or more different layers of graft shells (B2) can be used. Graft copolymers with multi-layer graft shells are for example described in EP-A 111260 and WO 2015/078751.

Block Copolymer (C)

The block copolymer (C) in the thermoplastic molding composition (T) of the invention may in general be any block copolymer that can be used as an additive in thermoplastic molding compositions in order to improve impact resistance.

Preferably, the block copolymer (C) comprises at least one hard block (C1), preferably at least two hard blocks (C1), comprising repeating units derived from at least one vinyl aromatic monomer, more preferably derived from at least one vinyl aromatic monomer selected from the group consisting of styrene and $\alpha$-methyl styrene, even more preferably derived from styrene; and at least one soft block (C2) comprising repeating units derived from at least one diene monomer, more preferably derived from at least one diene monomer selected from 1,3-butadiene or isoprene, even more preferably derived from 1,3-butadiene. In the context of the present invention, the term "repeating unit derived from" a certain monomer means that the repeating unit is a structure resultant from polymerization of the monomer into a polymer structure.

More preferably, the block-copolymer (C) comprises, or alternatively consists of, C1 28 to 40% by weight based on the total weight of block-copolymer (C), of at least one hard block (C1) comprising from 90 to 100% by weight, based on the total weight of the hard block (C1), of repeating units derived from vinyl aromatic monomers and from 0 to 10% by weight, based on the total weight of the hard block (C1), of repeating units derived from diene monomers, preferably 1,3-butadiene; and C2 60 to 72% by weight, based on the total weight of block copolymer (C), of at least one soft block (C2) comprising from 30 to 60% by weight, based on the total weight of soft block (C2), of repeating units derived from vinyl aromatic monomers, preferably styrene, and from 40 to 70% by weight, based on the total weight of soft block (C2), of repeating units derived from diene monomers, preferably 1,3-butadiene.

In a preferred embodiment, the block copolymer (C) is a thermoplastic elastomer, in particular a styrene-butadiene block copolymer (SBC).

Preferably, the block copolymer (C) comprises, or alternatively consists of, 54 to 73% by weight, more preferably 60 to 70% by weight, based on the total weight of block copolymer (C), of repeating units derived from vinyl aromatic monomers, preferably styrene, and 27 to 46% by weight, more preferably 30 to 40% by weight, based on the total weight of block copolymer (C), of repeating units derived from diene monomers, preferably 1,3-butadiene.

Preferably at least a part of the terminal blocks, more preferably all blocks of the block copolymer (C) are hard blocks (C1).

The hard block (C1) of the block copolymer (C) preferably consists of 100% by weight, based on the total weight of hard block (C1), of repeating units derived from styrene.

The soft block (C2) of the block copolymer (C) may have a random or a tapered distribution of the repeating units derived from the vinyl aromatic monomers and those derived from the diene monomers. Furthermore, the soft block (C2) may consist of multiple sequential portions, wherein two adjacent portions have a different composition and/or block length.

In a preferred embodiment, the block copolymer (C) is a thermoplastic elastomer, in particular a styrene-butadiene block copolymer.

The block copolymer (C) may be a star-shaped or linear block copolymer. Preferably, the block copolymer (C) is a linear styrene-butadiene block copolymer, in particular a linear styrene-butadiene block copolymer having properties of a thermoplastic elastomer.

Preferably, the block copolymer (C) has at least one of the following structures:

$$(C1)\text{-}\{(C2)\text{-}(C1)\}_n,$$

wherein n is a natural number from 1 to 10, preferably from 1 to 5, more preferably from 1 to 3, even more preferably 1;

$$\{(C2)\text{-}(C1)\}_n\text{-}X\text{-}\{(C1)\text{-}(C2)\}_n,$$

wherein X is the radical of a bifunctional initiator; and
n is a natural number from 1 to 10, preferably from 1 to 5, more preferably from 1 to 3, even more preferably 1;

$$Y\text{-}[\{(C1)\text{-}(C2)\}_n]_m,$$

wherein Y is the radical of an m-functional coupling agent;
m is a natural number from 1 to 10, preferably from 2 to 8, more preferably from 3 to 4; and
each n is independently a natural number from 1 to 10, preferably from 1 to 5, more preferably from 1 to 3, even more preferably 1;

$$[(C1)]_k\text{-}Z\text{-}[\{(C1)\text{-}(C2)\}_n]_m,$$

wherein Z is the radical of an (m+k)-functional coupling agent;
m and k are each independently a natural number from 1 to 9, the sum of m+k being a natural number from 2 to 10; and
each n is independently a natural number from 1 to 10, preferably from 1 to 5, more preferably from 1 to 3, even more preferably 1; or $$[(C1)]_k\text{-}Z\text{-}[\{(C1)\text{-}(C2)\}_n\text{-}(C1)]_m,$$

wherein Z is the radical of an (m+k)-functional coupling agent;
m and k are each independently a natural number from 1 to 9, the sum of m+k being a natural number from 2 to 10; and
each n is independently a natural number from 1 to 10, preferably from 1 to 5, more preferably from 1 to 3, even more preferably 1.

In the structures defined herein, n indicates the number of repetitions of the sequence inside the respective braces "{ }", whereas m and k indicate the number of chains inside the respective square brackets "[ ]" attached to Y or Z.

In one embodiment, the block copolymer (C) has the structure (C1)-{(C2)}$_n$-(C1), wherein n different or identical, preferably identical soft blocks (C2) are located between two terminal hard blocks (C1), with n being a natural number from 2 to 10, preferably 2 to 5, more preferably 2 to 4.

In another embodiment, the elastomeric block copolymer (C) is a linear block copolymer having the structure the structure (C1)-{(C2)}$_n$-(C1), wherein the content of repeating units derived from vinyl aromatic monomers in the soft blocks (C2) adjacent to the hard blocks (C1) is lower than in the other soft blocks (C2) with n preferably being a natural number from 3 to 10, more preferably 3 to 8, even more preferably 3 to 5.

The content of 1,2-diene linkages in the soft blocks (C2) of the block copolymer (C) is preferably below 20%, more preferably in the range from 9 to 15%, particularly preferably in the range from 9 to 12%, based on the total number of diene linkages (1,2- diene linkages, 1,4-cis-diene linkages and 1,4-trans-diene linkages) in the soft blocks (C2). Suitable block copolymers (C) having such a content of 1,2-diene linkages in the soft blocks (C2) are described in detail in WO 97/40079.

In a preferred embodiment, the block copolymer (C) is a linear block copolymer of the general structure (C1)-{(C2)}$_n$-(C1) having, situated between the two terminal hard blocks (C1), one or more soft blocks (C2) having a random distribution of repeating units derived from vinyl aromatic monomers and those derived from diene monomers and, wherein the content of 1,2-diene linkages in the entire block copolymer (C) is below 20%, based on the total number of diene linkages in the block copolymer (C) with n preferably being a natural number from 1 to 10, more preferably 2 to 5, even more preferably 2 to 4.

In a further preferred embodiment, the block copolymer (C) consists of one or more hard block (C1) consisting of repeating units derived from vinyl aromatic monomers, and one or more random soft blocks (C2) consisting of from 30 to 60% by weight, preferably 30 to 55% by weight, based on the total weight of the random soft blocks (C2), of repeating units derived from vinyl aromatic monomers and from 40 to 70% by weight, preferably from 45 to 70% by weight, based on the total weight of the random soft blocks (C2), of repeating units derived from dienes. Preferably the block copolymer (C) contains, and preferably consists of, the block sequence (C1)-(C2) or more preferably (C1)-(C2)-(C1), where the overall content of repeating units derived from diene is from 27 to 46% by weight, based on the total weight of block copolymer (C).

Particular preference is given to linear styrene-butadiene block copolymers (C) having two terminal hard blocks (C1) having, situated between the two terminal blocks (C1), one or more, preferably 1 to 5, more preferably 2 to 4, soft blocks (C2) having random styrene/butadiene distribution. These block copolymers are obtainable via anionic polymerization in a non-polar solvent with addition of a polar co-solvent or of a potassium salt, as described by way of example in WO 95/35335 or WO 97/40079 and WO 2010/072596.

Preferably, the weight-average molecular weight MW of at least one hard block (C1), more preferably of all hard blocks (C1) of the block copolymer (C) is in the range from 5,000 to 100,000 g/mol, more preferably 10,000 to 50,000 g/mol;

The melt viscosity rate (MVR) of the block copolymer (C) is preferably in a range from 5 to 20, more preferably from 10 to 18, even more preferably from 12 to 16 cm$^3$/10 min, measured according to ISO 1133 at a temperature of 200° C. and a load of 5 kg. Furthermore, the A/50 Vicat softening point of the block copolymer (C) is preferably in the range of from 35 to 50, more preferably of from 38 to 45° C. measured according to ISO 306. Moreover, the block copolymer (C) preferably is unbreakable in notched and unnotched charpy impact measurements according to ISO 179/1eU and ISO179/1eA, respectively.

The block copolymer (C) further preferably has an E-modulus in a range from 40 to 200 MPa, more preferably from 60 to 150 MPa, even more preferably from 70 to 100 MPa, stress at break preferably of from 2 to 10, more preferably from 2 to 8, even more preferably from 4 to 7, and strain at break of preferably more than 400%, each measured according to ISO 527-1A.

Further Polymer Components (D)

The thermoplastic molding composition (T) of the invention may optionally comprise up to 89.8% by weight, based on the total weight of the thermoplastic molding composition (T), of further polymer components (D). In contrast to the components of the recycled polymer material (A), the further polymer components (D) are typically not recycled and are added to the molding composition (T) in order to improve specific properties such as processability, mechanical performance, optical quality and/or heat resistance.

For example, the thermoplastic molding composition (T) may comprise 0 to 60% by weight, preferably 0.5 to 30% by weight, based on the total weight of the thermoplastic molding composition (T), of further polymer components (D). Alternatively, the thermoplastic molding composition (T) may comprise e.g. 30 to 89.8% by weight, preferably 40 to 70% by weight, based on the total weight of the thermoplastic molding composition (T), of further polymer components (D). In a particularly preferred embodiment, the thermoplastic molding composition (T) does not contain any further polymer components (D).

If further polymer components (D) are present in the thermoplastic molding composition (T), they are preferably selected from the group consisting of non-recycled SAN (styrene-acrylonitrile copolymer), SMMA (styrene-methyl methacrylate copolymer) PMMA (polymethyl methacrylate) and styrene-acrylonitrile-methyl methacrylate copolymers. SAN is especially preferred for best mechanical performance and heat distortion temperature. For better optical properties, PMAA or MMA copolymers may be selected as known to those skilled in the art.

Furthermore, the at least one further polymer component (D) can be selected from polycarbonates (PC) (including aromatic polycarbonates and aromatic polyester carbonates), polyamides (PA), polyesters, polyoxyalkylene, polyarylene sulfides, polyether ketones, and polyvinyl chlorides. Preferably, the optional polymer component (D) is selected from polycarbonates (PC) (including aromatic polycarbonates and aromatic polyester carbonates), polyamides (PA), and polyesters, more preferably from polycarbonates and polyamides, most preferably from aromatic polycarbonates and semicrystalline polyamides. In this embodiment, impact strength and heat distortion of the thermoplastic molding composition (T) may be improved significantly.

In one preferred embodiment of the invention the at least one further polymer component (D) is present in an amount of at least 0.5% by weight, based on the total weight of the thermoplastic molding composition (T), and comprises, preferably consists of, at least one styrene-acrylonitrile copolymer, at least one poly(methyl (meth)acrylate), at least one styrene-methyl (meth)acrylate copolymer, at least one polycarbonate, at least one polystyrene, or a combination of two or more thereof.

Filler and/or Reinforcing Agent (E)

The thermoplastic molding composition (T) of the invention may comprise up to 30% by weight, based on the total weight of the thermoplastic molding composition (T), of at least one filler or reinforcing agent (E). If a filler and/or reinforcing agent (E) is present, the total amount thereof is preferably from 0.01 to 30% by weight, more preferably 1 to 25% by weight, even more preferably 5 to 20% by weight, particularly preferably 7 to 18% by weight, based on the total weight of the thermoplastic molding composition (T).

The filler and/or reinforcing agent (E) may be selected from commonly known fillers and/or reinforcing agents for plastic materials. With respect to conventional fillers and/or reinforcing agents, reference is made by way of example to "Plastics Additives Handbook", Ralph D. Maier and Michael Schiller, 4th edition, Hanser Publ., Munich, 2016.

Examples that may be mentioned of fillers and/or reinforcing agents, which may be selected from particulate fillers and/or reinforcing agents, are silicates, amorphous silica, calcium silicates, such as wollastonite, powdered quartz, mica, metal oxides, metal hydroxides, carbon black, graphite, barium sulfate, calcium carbonate, magnesium carbonate, bentonites, talc, kaolin, carbon fibres or glass fibres in the form of glass woven, glass mats, or glass silk rovings, chopped glass, or glass beads. In particular at least one particulate filler and/ot reinforcing agent, preferably glass fibers can be used as filler and/or reinforcing agent (E).

Further Additives (F)

The thermoplastic molding composition (T) of the invention may comprise up to 30% by weight, based on the total weight of the thermoplastic molding composition (T), of at least one further additive (F). If further additives (F) are present, their total amount is preferably from 0.001 to 30% by weight, more preferably 0.01 to 20% by weight, based on the total weight of the thermoplastic molding composition (T). In particular, the additive (F) is not a polymeric compound.

The further additive (F) may be selected from commonly known additives and/or auxiliaries for plastic materials. With respect to conventional auxiliaries and additives, reference is made by way of example to "Plastics Additives Handbook", Ralph D. Maier and Michael Schiller, 4th edition, Hanser Publ., Munich, 2016.

For example the at least one further additive (F) may be selected from dyes, pigments, lubricants or mold-release agents, stabilizers, in particular light and heat stabilizers, antioxidants, UV absorbers, plasticizers, impact modifiers, antistatic agents, flame retardants, bactericides, fungicides, optical brighteners, and blowing agents. The further additive (F) is preferably selected from dyes, pigments, lubricants or mold-release agents, stabilizers, in particular light stabilizers, antistatic agents and flame retardants.

Examples of suitable pigments are titanium dioxide, phthalocyanines, ultramarine blue, iron oxides, or carbon black, and also the entire class of organic pigments.

Common stabilizers for thermoplastic polymers encompass stabilizers for improving thermal stability, which are commonly agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, and benzophenones. Examples of suitable stabilizers are hindered phenols, but also vitamin E and compounds whose structure is analogous thereto. Preferred are oxygen radical scavengers such as Irganox® 1010 (BASF SE), Songnox® 1010, Irganox 1076, Irganox 565 and blends thereof, carbon radical scavengers such as Sumilizer® GS, Sumilizer GM and blends thereof, and/or secondary stabilizers such as Irgafos® 168 (BASF SE). Said stabilizers are commercially available. HALS stabilizers (Hindered Amine Light Stabilizers), benzophenones, resorcinols, salicylates, and benzotriazoles are also suitable.

Suitable lubricants or mold-release agents are fatty acids having from 12 to 30 carbon atoms, salts and derivatives thereof, for example stearic acid and stearates, palmitic acid and palmitates, stearyl alcohol, stearic esters, amide waxes (e.g. stearamides, in particular ethylene bis(stearamide) (EBS)), and polyolefin waxes. Particularly suitable lubricants and mold-release agents are stearic acid, stearates (e.g. magnesium stearate), palmitic acid, palmitates (e.g. sodium palmitate), ethylene bis(stearamide) (e.g. Irgawax®, Ciba, Switzerland) and mixtures thereof. Preferably the thermoplastic molding composition comprises 0.05 to 5% by weight, preferably 0.1 to 3% by weight, based on the total weight of the thermoplastic molding composition (T), of at least one lubricant or mold-release agents, more preferably ethylene bis(stearamide), at least one alkaline metal or alkaline earth metal stearate and/or at least one alkaline earth metal or alkaline earth metal palmitate.

Another aspect of the present invention is a process for preparing a thermoplastic molding composition (T) as described above, wherein the components (A), (B), (C), optionally (D), optionally (E) and optionally (F) are melt compounded at a temperature in the range of 180 to 280° C.

Preferably, prior to melt compounding, solid inorganic impurities are removed from the at least one recycled material (A). Alternatively, during compounding of the components (A), (B), (C), optionally (D), optionally (E) and optionally (F) one or preferably more sieves are used to remove un-melted impurities.

The inventive thermoplastic recycling molding composition may be prepared by processes known per se. For example extruders, such a co-rotating or counter rotating single- or twin screw extruders, or other conventional kneading apparatuses, such as continuous or batch kneaders, Brabender mixers or Banbury mixers, may be used for the preparation of the polymer composition. Said kneading elements should ensure sufficient homogenization of the components guaranteeing micro mixing. The polymer composition may be obtained by mixing and homogenization the components by the usual methods of plastic technology, wherein the sequence of adding the components may be varied.

Preferably, the recycled polymer material (A) is pre-treated before the melt compounding with the other components, e.g. via homogenization, grinding, crushing, micronization.

Another aspect of the present invention is the use of the inventive thermoplastic molding composition (T) described above for the preparation of shaped articles (moldings) for various applications, e.g. applications in automotive sector, electronics, household articles, constructions, healthcare articles, packaging, sports and leisure articles. The thermoplastic molding composition (T) of the invention can be used for the production of moldings of any type.

This includes, but is not limited to, preparing the shaped article by extrusion, injection molding, rotomolding, casting, blow molding, spraying, spinning, rolling or weaving, in particular extrusion or injection molding. Another type of processing is the production of moldings via thermoforming from sheets or films previously produced, and the process of film-overmolding. In particular the inventive thermoplastic recycling molding composition is used in an injection molding process. Examples of these shaped articles are films, profiles, housing parts of any type, e.g. for household devices such as juice presses, coffee machines, mixers; for office equipment such as monitors, printers, copiers; exterior and interior parts of automobiles; sheets, pipes, electrical installation ducts, windows, doors and other profiles for the construction sector (fitting-out of interiors and outdoor applications), and also parts for electrical and electronic uses, such as switches, plugs and sockets.

Furthermore, one aspect of the present invention is a shaped article prepared from the thermoplastic molding composition (T). Preferably, the shaped article is one as described above.

The present invention is illustrated by the following examples and claims.

EXAMPLES

Physical Testing of Products:

Charpy-impact strength was tested at 23° C. or –10° C. at (50±5)% r.h. (relative humidity) according to ISO 179/1eA (notched) on bars molded at a mass temperature of 250° C. and a mold temperature of 80° C. If not stated otherwise, the unit is kJ/m².

Melt flow rate or melt viscosity rate (MVR) was determined on a polymer melt at 220° C. with a load of 10 kg according to ISO 1133-1:2012. If not stated otherwise, the unit is mL/10 min.

Tensile strain at yield (elongation) was measured at 23° C. at (50±5)% r.h. according to ISO 527/1996 on specimens molded at a mass temperature of 250° C. and a mold temperature of 80° C. Speed of measurement was 50 mm/min.

Recycled Polymer Material (A)

As recycled polymer material (A), a recycled post-consumer waste was used (WEEE; Waste of Electrical and Electronic Equipment, according to European Community Directive 2012/19/EU).

The material was black from using carbon black as main pigment and small amounts of other colorants. The material was not sorted by color, but only by the type of polymers.

The sorted flakes have been compounded in order to level performance of the material. Furthermore, a melt sieve has been used in order to remove un-melted (mostly inorganic) contaminations. The remaining ash content in the recycled polymer material was 1% by weight, based on the weight of the recycled polymer material (A) (complete combustion).

Mass ratio of the monomers acrylonitrile, butadiene and styrene was 23:15:62 (as measured by IR spectroscopy).

The content of acrylonitrile-butadiene-styrene copolymer was 34% by weight, based on the total weight of polymeric components in (A) and the content of acrylonitrile-styrene copolymer was 64% by weight, based on the total weight of polymeric components in (A). Other polymeric impurities were present in an amount of 1.5% by weight, based on the total weight of polymeric components in (A), wherein the main impurity was high impact polystyrene (HIPS).

As a non-polymeric impurity, the recycled material (A) contained 2.1% by weight, based on the total weight of the recycled material (A), of EBS wax (CAS 110-30-5).

Graft Copolymer (B)

ABS graft rubber produced in radically initiated (potassium persulfate) emulsion polymerization in two polymerization steps. 5 kg of butadiene was first polymerized in the presence of demineralized water, 100 g anionic emulsifier, 25 g 2,3,3,4,4,5-hexamethylhexane-2-thiol (technical mixture containing also other isomers) and 15 g potassium peroxodisulfate at temperatures around 70° C. over a period of 20 hr. The resultant particle size was 100 nm and solid content of the latex about 45 wt %. A second batch was prepared with a polymerization time of 2 days by polymerizing 5 kg of butadiene in the presence of demineralized water, 40 g anionic emulsifier, 45 g 2,3,3,4,4,5-hexamethylhexane-2-thiol (technical mixture containing also other isomers) and 20 mg potassium peroxodisulfate at temperatures around 70° C. and a resulting particle size of 290 nm and solid content of the latex about 50 wt %. A third polymerization batch was prepared with a polymerization time of 4 days by polymerizing 5 kg of butadiene in the presence of demineralized water, 30 g anionic emulsifier, 30 g 2,3,3,4,4,5-hexamethylhexane-2-thiol (technical mixture containing also other isomers) and 25 g potassium peroxodisulfate at temperatures around 80° C. and a resulting particle size of 400 nm and solid content of the latex about 50 wt %.

3 kg of the first polybutadiene-latex (solids) was grafted with 740 g acrylonitrile and 2.1 kg styrene under addition of 80 g anionic emulsifier, 6 g 2,3,3,4,4,5-hexamethylhexane-2-thiol (technical mixture containing also other isomers) and 30 mg potassium peroxodisulfate at temperatures from 60 to 80° C. (increase over three hours) over five hours. 3 kg of the mixture of the second and third polybutadine lattices (1:1 by weight solids) were grafted with 0.5 kg acrylonitrile and 1.5 kg styrene under addition of 70 g anionic emulsifier, 6 g 2,3,3,4,4,5-hexamethylhexane-2-thiol (technical mixture containing also other isomers) and 25 g potassium perox- odisulfate at temperatures from 60 to 80° C. (increase over three hours) over five hours. 5 kg of the former graft latex (solids) were mixed with κ kg of the latter graft latex (solids) and a stabilizer dispersion containing a hindered phenol and a sulfur synergist.

The resulting latex was precipitated by adding $MgSO_4$ electrolyte at temperatures between 60 and 90° C., mechani- cally dewatered and afterwards dried for 10 h in a well ventilated oven at 60°. The graft polymer B was obtained as fine, dry powder with a residual moisture content of 0.2% by weight.

Block Copolymer (C)

In a batch reactor (stainless steel reactor, stirred, 50 m³) 20500 L of cyclohexane at 40° C. was used as initial charge and 1,344 L styrene (S1) was added at 20 m³/h. When 134 L of S1 had been dosed, 46.43 L of a 1.4 M sec-butyllithium solution (BuLi 1) for initiation and 6.03 L of a 5 wt % potassium tert-amylate solution in cyclohexane as random- izer had been dosed at once. The reaction was allowed to proceed under continuous stirring to complete monomer consumption (identified by no further temperature increase of the reaction mixture). After complete monomer consump- tion, the polymerization mixture was cooled by means of reflux cooling to a temperature below 65° C.

In a next step, 924 L styrene (S2) and 1,439 L butadiene (B1) were added together and the polymerization reaction, under continuous stirring, was allowed to run to complete monomer consumption (identified by no further temperature increase of the reaction mixture). After complete monomer consumption, the polymerization mixture was cooled by means of reflux cooling to a temperature below 48° C.

In a next step, 1,193 L of styrene (S3) and 1,857 L of butadiene (B2) were added together and the polymerization reaction, under continuous stirring, was allowed to run to complete monomer consumption (identified by no further temperature increase of the reaction mixture). After com- plete monomer consumption, the polymerization mixture was cooled by means of reflux cooling to a temperature below 65° C. In a next step, 655 L styrene (S4) and 1,020 L butadiene (B3) were added together and the polymerization reaction, under continuous stirring, was allowed to run to complete monomer consumption (identified by no further temperature increase of the reaction mixture). After com- plete monomer consumption, the polymerization mixture was cooled by means of reflux cooling to a temperature below 65° C. In a next step, 1,344 L styrene (S5) was added and the polymerization reaction, under continuous stirring, was allowed to run to complete monomer consumption (identified by no further temperature increase of the reaction mixture).

10 minutes after the last complete monomer consumption, 9.5 L isopropanol was added to the polymer solution and allowed to react for 10 minutes while stirring. Finally, the reaction mixture was stabilized by acidification with 0.06 phm* demineralized water and a 0.43 phm $CO_2$ gas stream and stabilized with 0.15 phm Sumilizer® GS, 0.20 phm Irganox® 1010 and 0.15 phm Irgaphos® 168 in a continuous fashion using a static mixer.

*phm="parts by weight per hundred parts by weight of monomer" (wt.-% of component (initiator, coupling agent etc.) is calculated on the total mass of the monomers).

Finally, the cyclohexane solvent was removed by means of a flash evaporization followed by a degassing extruder and under water palletization to obtain the styrene-butadiene block-copolymer granulate.

All compounds mentioned in the tables below have been produced on a ZSK twin screw extruder with 3 kneading blocks typical for ABS compounding, maximum melt tem- perature was 250° C. and torque was about 70%.

As can be seen from table 1, at a content of 90% by weight of recycled polymer material (A), addition of 5% by weight of graft copolymer (B) and 5% by weight of block copoly- mer (C) (example 1) gives a better property profile than addition of 10% by weight of graft copolymer (B) alone (comparative example 1) or addition of 10% by weight of block copolymer (C) alone (comparative example 2). For comparative example 1, Charpy notched impact strength increases significantly, yet MVR decreases significantly in comparison to the recycled polymer material (A) alone (reference example). For comparative example 2, MVR increases significantly, but Charpy notched impact strength increases to a lesser extent than in comparative example 1. The combination of both graft copolymer (B) and block copolymer (C) (example 1) results in higher Charpy notched impact strength than in both comparative examples, and a significant increase in MVR. In all cases, a slight increase of tensile strain at yield (elongation) was observed in compari- son to reference example.

At a content of 80% by weight of the recycled polymer material (A), addition of 20% by weight of block-copolymer (C) does not lead to a stable composition that can be evaluated. Addition of 20% by weight of graft copolymer (B) leads to a significant increase of Charpy notched impact strength, but also to a significant deterioration of MVR (comparative example 3). In comparison, addition of 15% by weight of graft copolymer (B) and 5% by weight of block copolymer (C) leads to an even greater increase of Charpy notched impact strength, whereas MVR deteriorates to a much lesser extent (example 2). The addition of 10% by weight of graft copolymer (B) and 10% by weight of block copolymer (C) also leads to an increase of Charpy notched impact strength over comparative example 3, and an even more pronounced increase of MVR (example 3).

In all cases, a slight increase of tensile strain at yield (elongation) was observed in comparison to the recycled polymer material (A) without the graft copolymer (B) and the block copolymer (C) (reference example).

TABLE 1

| Ingredient | Ref. Ex. | Comp. Ex. 1 | Comp. Ex. 2 | Ex. 1 | Comp. Ex. 3 | Ex. 2 | Ex. 3 |
|---|---|---|---|---|---|---|---|
| (A) [% by weight] | 100 | 90 | 90 | 90 | 80 | 80 | 80 |
| (B) [% by weight] | 0 | 10 | 0 | 5 | 20 | 15 | 10 |
| (C) [% by weight] | 0 | 0 | 10 | 5 | 0 | 5 | 10 |
| MVR 220/10 [mL/10 min] | 26.0 | 22.5 | 44.4 | 31.1 | 15.4 | 23.1 | 35.4 |
| Charpy notched impact strength (23° C.) [kJ/m²] | 8.2 | 13.3 | 12.1 | 13.6 | 17 | 22 | 24 |
| Charpy notched impact strength (−10° C.) [kJ/m²] | 5.8 | 7.5 | 6.7 | 7.4 | 9.8 | 10.4 | 9.9 |
| Tensile strain at yield (elongation) [%] | 2.2 | 2.3 | 2.5 | 2.4 | 2.4 | 2.5 | 2.6 |

As it can be seen, the thermoplastic molding compositions comprising high amounts of (A) and comprising ABS com- ponent (B) and comprising SBC-component (C) had a particularly good balance of properties, in particular Charpy impact strength and tensile strain at yield.

The invention claimed is:

1. A thermoplastic molding composition (T) comprising:

A 10 to 90% by weight, based on the total weight of the thermoplastic molding composition (T), of at least one type of recycled polymer material (A), containing A1 20 to 100% by weight, based on the total weight of the recycled material (A), of at least one recycled acrylonitrile-butadiene-styrene copolymer (A1);

A2 optionally up to 80% by weight, based on the total weight of the recycled material (A), of at least one recycled styrene-acrylonitrile copolymer (A2); and A3 optionally up to 10% by weight, based on the total weight of the recycled material (A), of recycled polymeric impurities (A3), different from (A1) and (A2);

B 0.1 to 30% by weight, based on the total weight of the thermoplastic molding composition (T), of at least one graft copolymer (B), different from (A);

C 1 to 18% by weight, based on the total weight of the thermoplastic molding composition (T), of at least one block copolymer (C);

D optionally up to 30% by weight, based on the total weight of the thermoplastic molding composition (T), of at least one further polymer component (D), different from (A), (B), and (C);

E optionally up to 30% by weight, based on the total weight of the thermoplastic molding composition (T), of at least one filler and/or reinforcing agent (E); and F optionally up to 30% by weight, based on the total weight of the thermoplastic molding composition (T), of at least one further additive (F), wherein no further polymer component (D) is present or the further polymer component (D) is selected from the group consisting of non-recycled styrene-acrylonitrile copolymer, styrene-methyl methacrylate copolymer, polymethyl methacrylate, styrene-acrylonitrile-methyl methacrylate copolymers, polycarbonates, polyamides, polyesters, polyoxyalkylene, poly-arylene sulfides, and polyether ketones, and wherein the recycled polymer material (A) is a recycled material obtained from the recycling of post-consumer and/or post-industrial goods.

2. The thermoplastic molding composition (T) of claim 1, comprising:

A 50 to 90% by weight, based on the total weight of the thermoplastic molding composition (T), of the at least one recycled material (A);

B 1 to 20% by weight, based on the total weight of the thermoplastic molding composition (T), of the at least one graft copolymer (B);

C 1 to 15% by weight, based on the total weight of the thermoplastic molding composition (T), of the at least one block copolymer (C);

D optionally up to 30% by weight, based on the total weight of the thermoplastic molding composition (T), of at least one further polymer component (D);

E optionally up to 25% by weight, based on the total weight of the thermoplastic molding composition (T), of at least one filler and/or reinforcing agent (E); and F optionally up to 10% by weight, based on the total weight of the thermoplastic molding composition (T), of at least one further additive (F).

3. The thermoplastic molding composition (T) of claim 1, wherein the at least one graft copolymer (B) comprises at least one acrylonitrile-butadiene-styrene graft copolymer.

4. The thermoplastic molding composition (T) of claim 3, wherein the at least one graft copolymer (B) consists of at least one acrylonitrile-butadiene-styrene graft copolymer.

5. The thermoplastic molding composition (T) of claim 1, wherein the at least one graft copolymer (B) comprises at least one acrylonitrile-butadiene-styrene graft copolymer (B), which is obtained by emulsion polymerization.

6. The thermoplastic molding composition (T) of claim 1, wherein the at least one block copolymer (C) comprises at least one block copolymer of a vinyl-aromatic monomer and a diene monomer.

7. The thermoplastic molding composition (T) of claim 6, wherein the at least one block copolymer (C) consists of at least one block copolymer of a vinyl-aromatic monomer and a diene monomer.

8. The thermoplastic molding composition (T) of claim 6, wherein the at least one block copolymer (C) comprises at least one styrene-butadiene copolymer.

9. The thermoplastic molding composition (T) of claim 1, wherein the at least one block copolymer (C) has at least three types of blocks.

10. The thermoplastic molding composition (T) of claim 1, wherein the terminal blocks of the at least one block copolymer (C) are derived from a vinyl-aromatic monomer.

11. The thermoplastic molding composition (T) of claim 10, wherein the terminal blocks of the at least one block copolymer (C) are derived from styrene.

12. The thermoplastic molding composition (T) of claim 1, wherein the at least one further polymer component (D) is present in an amount of at least 0.5% by weight, based on the total weight of the thermoplastic molding composition (T), and comprises at least one styrene-acrylonitrile copolymer, at least one poly(methyl (meth)acrylate), at least one styrene-methyl (meth)acrylate copolymer, at least one polycarbonate, at least one polystyrene, or a combination of two or more thereof.

13. The thermoplastic molding composition (T) of claim 12, wherein the at least one further polymer component (D) consists of at least one styrene-acrylonitrile copolymer, at least one poly(methyl (meth)acrylate), at least one styrene-methyl (meth)acrylate copolymer, at least one polycarbonate, at least one polystyrene, or a combination of two or more thereof.

14. The thermoplastic molding composition (T) of claim 1, wherein no further polymer component (D) is present.

15. The thermoplastic molding composition (T) of claim 1, wherein the weight ratio of the at least one graft copolymer (B) to the at least one block copolymer (C) is from 1:3 to 3:1.

16. The thermoplastic molding composition (T) of claim 15, wherein the weight ratio of the at least one graft copolymer (B) to the at least one block copolymer (C) is from 1:1.2 to 1.2:1.

17. A process for preparing a thermoplastic molding composition (T) of claim 1, wherein the components (A), (B), (C), optionally (D), optionally (E), and optionally (F) are melt compounded at a temperature in the range of 180 to 280° C.

18. The process of claim 17, wherein solid inorganic impurities are removed from the at least one recycled material (A) prior to the melt compounding.

19. A shaped article prepared from the thermoplastic molding composition (T) of claim 1.

20. The thermoplastic molding composition (T) of claim 1, wherein the recycled polymer material (A) exhibits one or more physical properties selected from:

i) Melt volume flow rate (MVR), measured on a polymer melt at 220° C. and 10 kg load according to ISO 1133-1:2011, in the range of 10 to 35 $cm^3$/10 min;

ii) Vicat temperature, measured according to ISO 306: 2004 as Vicat B/50, of more than 80° C.;

iii) Stress at yield, measured in accordance with ISO 527:2012, in the range of 30 to 50 MPa;

iv) Strain at yield, measured in accordance with ISO 527:2012, in the range of 2 to 3%;

v) Charpy Notched Impact Strength at 23° C., measured in accordance with EN-ISO 179-1:2010, notch type A, in the range of 2 to 20 $kJ/m^2$; and vi) Charpy Notched Impact Strength at −30° C., measured in accordance with EN-ISO 179-1:2010, notch type A, in the range of 2 to 15 $kJ/m^2$.

\* \* \* \* \*